United States Patent [19]

Shustov

[11] Patent Number: 5,438,807
[45] Date of Patent: Aug. 8, 1995

[54] CONSUMABLE SHOCK EVADER

[76] Inventor: Valentin Shustov, 536 3/4 N. Genesee Ave., Los Angeles, Calif. 90036

[21] Appl. No.: 154,083

[22] Filed: Nov. 18, 1993

[51] Int. Cl.$^6$ ........................ E02D 27/34; E04B 1/98
[52] U.S. Cl. .................................. 52/167.4; 52/167.1
[58] Field of Search .......... 52/167 T, 167 S, 167 RM, 52/167 RA, 167 RS, 167 R; 248/550, 638

[56] References Cited

U.S. PATENT DOCUMENTS

| | | | |
|---|---|---|---|
| 1,761,659 | 6/1930 | Cummings | 52/167 RS |
| 2,359,036 | 9/1944 | Harper | 52/167 RS |
| 3,347,002 | 10/1967 | Penkuhn | 52/167 RM |
| 4,462,955 | 7/1984 | Albin et al. | 52/167 RA |
| 4,644,714 | 2/1987 | Zayas | 52/167 RM |

FOREIGN PATENT DOCUMENTS

| | | | |
|---|---|---|---|
| 183060 | 7/1990 | Japan | 52/167 RA |
| 755988 | 8/1980 | U.S.S.R. | 52/167 RM |
| 1399439 | 5/1988 | U.S.S.R. | 52/167 RS |

*Primary Examiner*—Michael Safavi

[57] ABSTRACT

A manufacture to protect a structure from destructive earthquakes, having a number of slip joints, each joint comprises a consumable-while-sliding vertical cylinder and is rigidly coupled to a supported structure; each joint is supported by a pedestal plate having a slightly sagged upper surface which consists of three surfaces gradually transforming one into another forming a central concave area, an intermediate convex area, and a boundary concave area. The force of gravity will keep a superstructure in its pre-earthquake location on the pedestal plate until the magnitude of the earth movement exceeds a certain threshold. When the intensity of earth shaking builds up, the foundation will slip aside under the superstructure, the consumable cylinder eventually will shift into the convex area of the pedestal plate surface and the system will activate its softening ability. As a result, a transfer and accumulation of earthquake energy in the superstructure will be significantly curbed. Any excessive travel of the slip joint will be buffered smoothly with the help of the concave profile of the ultimate restraint area.

1 Claim, 1 Drawing Sheet

CONSUMABLE SHOCK EVADER

BACKGROUND OF THE INVENTION

1. Field of the Invention

The present invention relates to seismic isolation technique. More particularly, the invention relates to gravitational sliding pendulum systems.

2. Description of the Prior Art

The inventions entitled "Seismic Isolator" and "Multi-Step Base Isolator" (U.S. Pat. Nos. 4,974,378 and 5,056,280) incorporate ball transfer units which, due to their relatively small surface of contact with the pedestal plate, confine the bearing capacity of these types of isolators. Besides, the horizontal diameter of the pedestal plate heavily depends on the anticipated amplitudes and other characteristics of a possible earth vibration, and can be neither determined accurately because of probabalistic nature of the problem, nor sometimes manufactured to the full extent due to various kinds of imposed restrictions.

To prevent sliders from going out of the working surface of the pedestal plates, the current practice suggests enclosing cylinders (U.S. Pat. Nos. 4,644,714 and 4,883,250) with vertically projecting walls which inevitably cause heavy impacts in the case of contact and therefore are a remedy that is worse than the problem at hand.

To provide an adequate vertical bearing capacity, some kinds of expansion pads can be used, however they are not compatible with the gravitational type of sliding pendulum systems. A known type of seismic bearing that can, allegedly, keep the vertical reactions centered, is the Earthquake Protective Column Support (U.S. Pat. No. 4,644,714), however, it is not intended to slide on surfaces other than spherical.

SUMMARY OF THE INVENTION

To increase the bearing capacity of low friction sliding seismic isolators, while preserving their non-destructive softening ability, the present isolator is offered which includes a slip joint and a pedestal plate. The slip joint, consisting of a housing with an inserted consumable vertical cylinder, supports a superstructure and rests on the central and the lowest part of the pedestal plate shaped as a sequence of concentric spherical surfaces and positioned on a foundation. The upper surface of the pedestal plate contains three successive areas smoothly transforming into each other. These surfaces form:

1) the concave inner surface whose width is equal to the consumable cylinder's lower surface area width;
2) the convex intermediate surface of a radius of vertical curvature a few times larger than that of the inner surface; and
3) the concave outer surface of a radius of vertical curvature much smaller than that of the intermediate surface.

Geometry of the working surfaces of the pedestal plate depends on properties of the structure and the slip joints, as well as on the anticipated earthquake characteristics and the targeted pattern of structural performance.

BRIEF DESCRIPTION OF THE DRAWING

In the description of the invention herein presented, references are made to the accompanying drawing in FIG. 1 which depicts a schematic perspective of a seismic isolator with the associated superstructure and foundation.

DESCRIPTION OF THE PREFERRED EMBODIMENT

Figure 1:
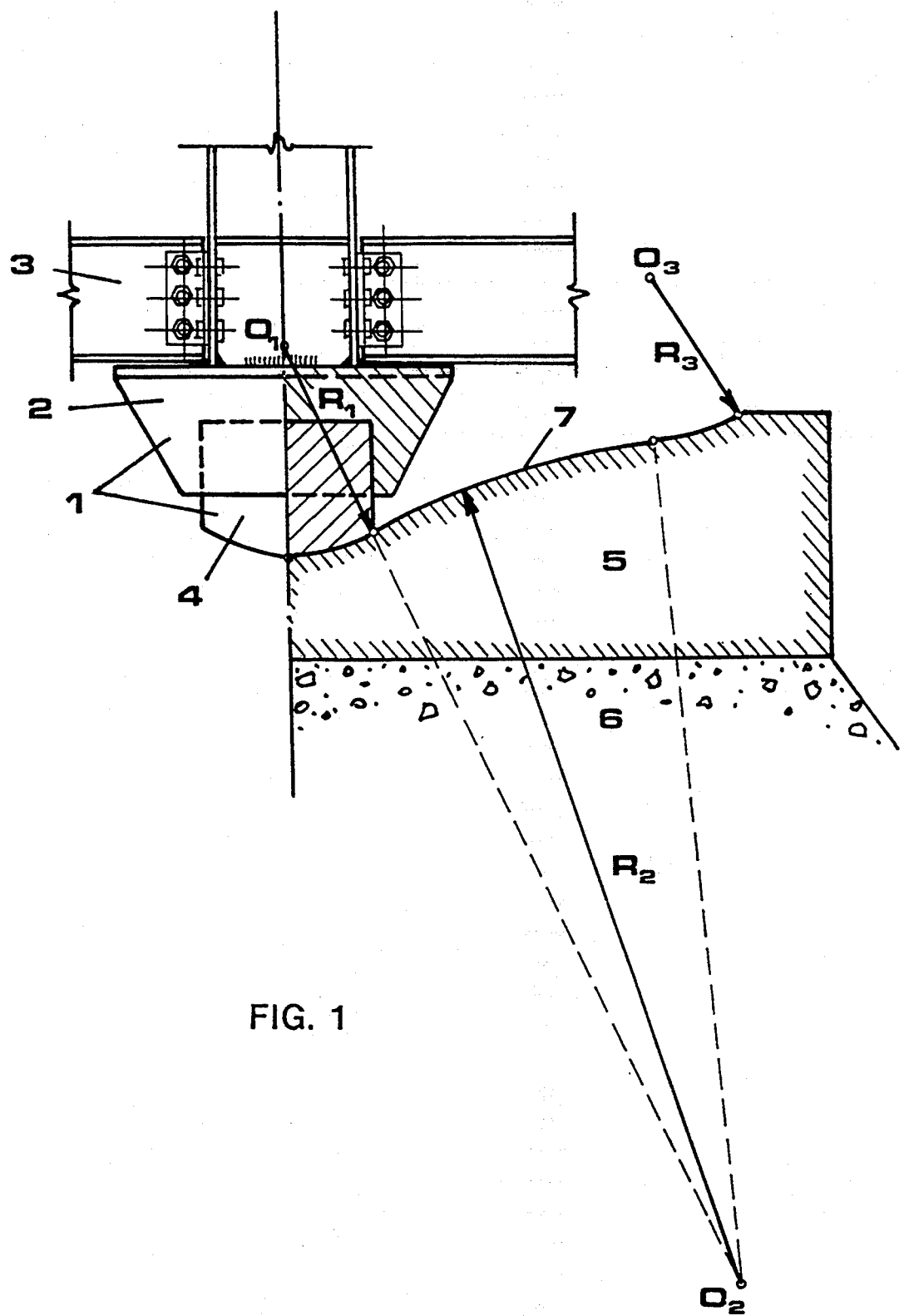

The present invention will be described with reference to the accompanying drawing. As illustrated at FIG. 1, the seismic isolator according to the invention has a slip joint (1) consisting of a housing (2), that is attached to a superstructure (3), with a consumable cylinder (4) resting on a pedestal plate (5) which is positioned on a foundation (6). The consumable cylinder (4) is made of material with an adequate axial bearing capacity but with a low shear strength resistance and a low coefficient of friction in order to facilitate a lateral sliding movement irrespective of the lack of coincidence of contacting surfaces of the cylinder and the pedestal plate. The slip joint (1) supports the superstructure (3) and permits the foundation (6) with the pedestal plate (5) to move horizontally and separately from the superstructure. While in the initial position of static contact, the consumable cylinder (4) is centered at the lowest point of the upper surface (7) of the pedestal plate (5), and its lower end is shaped in compliance with the concave configuration of the central depression of the pedestal plate (5). The diameter of the consumable cylinder and the radius of vertical curvature of the central depression $R_1$ centered at $O_1$ are governed mainly by the weight and dynamic properties of the superstructure, as well as by the design wind load. When a magnitude of the earth movement exceeds a specified threshold, the pedestal plate starts shifting relative to the superstructure, the cylinder (4) begins to lose the area of the contact with the pedestal plate, the pressure on the contacting surface builds up, the coefficient of friction goes down which facilitates the process of seismic separation though at the expense of severe abrasion due to the low shear strength of the cylinder's material. Since during its lifetime a structure will unlikely experience more than some hundred strong pulses, said abrasion will not cause any structural damage. As the relative travel of the superstructure increases, the consumable cylinder and the corresponding resultant bearing reaction will shift into the convex surface area of radius $R_2$ (centered at $O_2$) which provides the system with progressively softening ability thus preventing the superstructure from resonant amplifications. At a certain distance from the central axis which is defined by the global design considerations, the convex surface of the pedestal plate transfers into the concave surface of radius $R_3$ (centered at $O_3$) and this last surface provides a controllable and impact-proof ultimate restraint.

What is claimed:

1. A system of seismic base isolation devices attached to a supported superstructure to separate a superstructure from a rocking foundation for protection against damaging effect of strong earthquakes, with each of said devices comprising:

a slip joint consisting of a consumable cylinder of a low shear strength and low friction material, said cylinder positioned in a massive housing, said housing located above said cylinder and rigidly connected to said supported superstructure;

a pedestal plate attached to a foundation and supporting said consumable cylinder with said cylinder being in sliding contact, along a lower surface thereof, with a concave upper surface of said pedestal plate during a lateral vibration of said foundation.

said pedestal plate having an upper surface containing three successive spherical areas smoothly transforming into each other and comprising:

a concave central surface having a horizontal dimension equal to the corresponding horizontal dimension of the consumable cylinder's lower surface;

a convex intermediate surface having a radius of vertical curvature a plurality times larger than the radius of curvature of said central surface; and a concave outer surface having a radius of vertical curvature much smaller than the radius of curvature of said intermediate surface.

* * * * *